(12) United States Patent
Noguchi et al.

(10) Patent No.: US 10,120,677 B2
(45) Date of Patent: Nov. 6, 2018

(54) METHOD OF REWRITING PRINTER FIRMWARE, AND PRINTER

(71) Applicant: Seiko Epson Corporation, Tokyo (JP)

(72) Inventors: Makoto Noguchi, Suwa (JP); Akio Takamoto, Shiojiri (JP); Makoto Yoshiki, Matsumoto (JP); Masahiro Takei, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 15/193,359

(22) Filed: Jun. 27, 2016

(65) Prior Publication Data
US 2017/0003955 A1   Jan. 5, 2017

(30) Foreign Application Priority Data

Jul. 2, 2015 (JP) .................................. 2015-133374

(51) Int. Cl.
G06F 9/44 (2018.01)
G06F 8/654 (2018.01)
G06F 9/445 (2018.01)

(52) U.S. Cl.
CPC .............. G06F 8/654 (2018.02); G06F 8/665 (2013.01)

(58) Field of Classification Search
CPC .................................. G06F 8/654; G06F 8/665
USPC ........................................................ 717/168
See application file for complete search history.

(56) References Cited

U.S. PATENT DOCUMENTS

| | | | |
|---|---|---|---|
| 8,782,633 B1* | 7/2014 | Tamilarasan | G06F 8/665 717/173 |
| 2006/0070055 A1* | 3/2006 | Hodder | G06F 8/65 717/168 |
| 2006/0184781 A1* | 8/2006 | Inada | G06F 8/60 713/1 |
| 2006/0200707 A1* | 9/2006 | Shishido | G06F 11/1433 714/100 |
| 2008/0120610 A1* | 5/2008 | Katano | G06F 8/65 717/168 |
| 2010/0238489 A1* | 9/2010 | Meyerhofer | G07F 17/32 358/1.15 |
| 2010/0313092 A1* | 12/2010 | Xu | G06F 11/2236 714/738 |
| 2010/0328707 A1* | 12/2010 | Miyake | G06F 3/1204 358/1.15 |
| 2013/0159642 A1* | 6/2013 | Todaka | G06F 12/02 711/156 |

(Continued)

FOREIGN PATENT DOCUMENTS

| | | |
|---|---|---|
| JP | 2002-297409 A | 10/2002 |
| JP | 2003-058387 A | 2/2003 |
| JP | 2007-310783 A | 11/2007 |

*Primary Examiner* — Chameli Das
(74) *Attorney, Agent, or Firm* — Foley & Lardner LLP (57) ABSTRACT

A printer having multiple processor cores, and a firmware rewriting method for the printer, enable rewriting firmware in a short time. A first rewrite controller controls rewriting the firmware of the first core by the boot program of the first core; a second rewrite controller controls rewriting the firmware of a second core, which is one of the multiple cores other than the first core, by the boot program of the first core; and a reset unit resets the printer after rewriting the firmware of the first core and the firmware of the second core by the boot program of the first core ends.

8 Claims, 7 Drawing Sheets

(56) References Cited

U.S. PATENT DOCUMENTS

| | | | | |
|---|---|---|---|---|
| 2014/0317611 A1* | 10/2014 | Wojcik | .................. | G06F 8/71 |
| | | | | 717/168 |
| 2015/0007161 A1* | 1/2015 | Yagi | .................. | G06F 8/665 |
| | | | | 717/171 |
| 2015/0317150 A1* | 11/2015 | Suwabe | .................. | G06F 8/65 |
| | | | | 717/168 |
| 2016/0103670 A1* | 4/2016 | Chen | .................. | G06F 8/665 |
| | | | | 717/168 |
| 2017/0003916 A1* | 1/2017 | Noguchi | .................. | G06F 3/123 |

* cited by examiner

METHOD OF REWRITING PRINTER FIRMWARE, AND PRINTER

This application claims priority under 35 U.S.C. § 119 to Japanese Patent Application No. 2015-133374 filed on Jul. 2, 2015, the entire disclosure of which is expressly incorporated by reference herein.

BACKGROUND

1. Technical Field

The present invention relates to a firmware rewriting method of rewriting firmware in a printer having multiple cores, and a printer.

2. Related Art

JP-A-2007-310783 is an example of technology related to rewriting printer firmware. JP-A-2007-310783 teaches technology enabling rewriting new firmware to flash memory storing existing firmware after copying new firmware to a hard disk, and then rebooting.

One way to increase printer functionality is to increase the number of processor cores. Functions such as communication and background processing can be added by increasing the number of cores. When a new core is added, firmware upgrades must be applied to each core.

Figure 7:
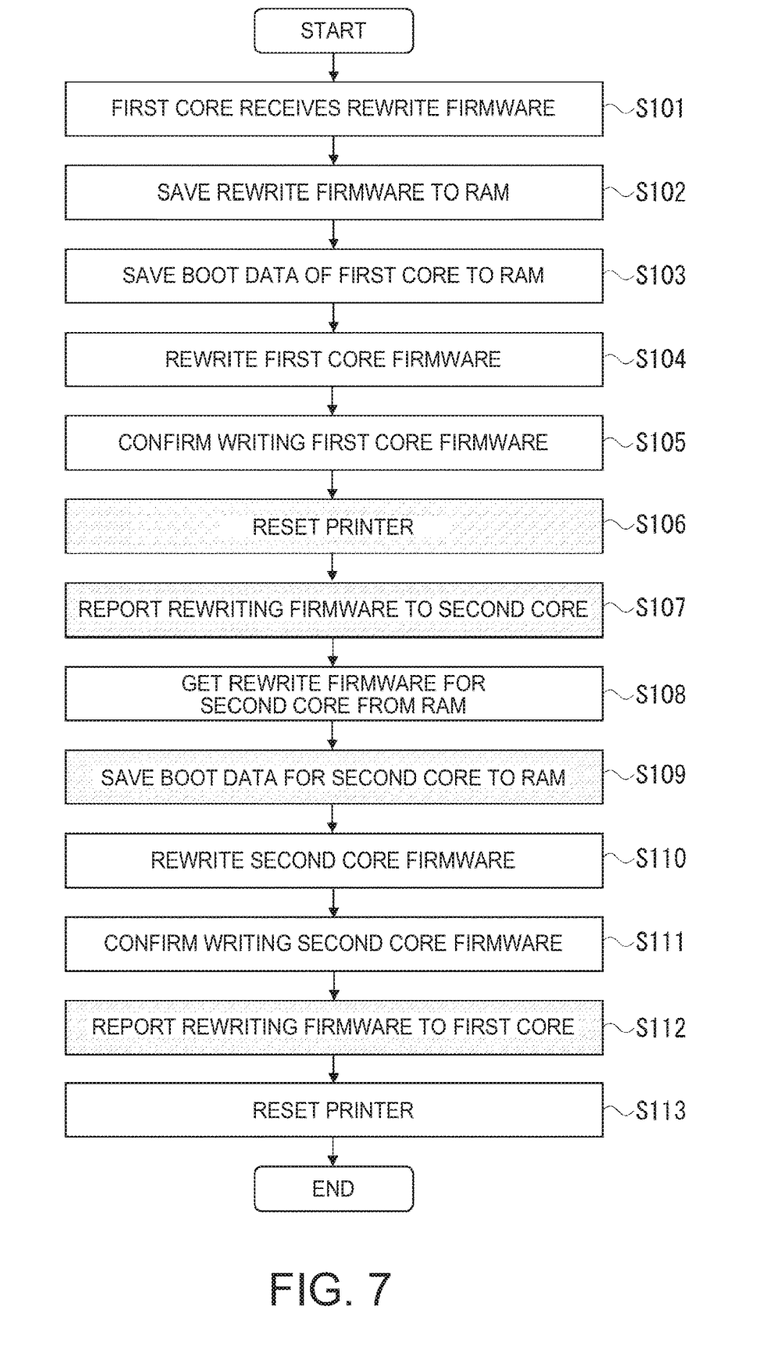
FIG. 7 is a flow chart illustrating the flow of the firmware rewriting process according to the related art.

FIG. 7 is a flow chart of a typical program for rewriting firmware in a printer with two cores. In this example, one (the first) of the two cores receives updated firmware to update the firmware of the first core and the second core, and stores the updated firmware to RAM, which is internal memory of the first core.

As shown in FIG. 7, when the first core receives the new firmware (S101), it stores the firmware to RAM (S102). Next, the boot data (boot program) of the first core is saved to RAM (S103), the firmware of the first core is rewritten by the boot data (S104), and the operation is checked with a checksum (S105). When successfully updating the firmware of the first core is confirmed, the printer resets (S106), and the first core reports completing the rewrite operation to the second core (S107). Next, the second core acquires the updated firmware for the second core from RAM in the first core (S108), and saves the boot data of the second core to RAM in the second core (S109). When the firmware of the second core is rewritten by the boot data (S110), the second core confirms the data was successfully rewritten by a checksum (S111). When successfully updating the firmware of the second core is confirmed, the second core reports completing the rewrite operation to the first core (S112), and then resets the printer again (S113).

As shown in FIG. 7, when firmware is updated for multiple cores in the related art, the reset process repeats for each core (S106, S113), and operation is time-consuming. If this updating process takes long, the likelihood of a problem happening, such as the user accidentally turning the printer off or communication being interrupted while data is being written, increases. The updating (rewriting) process is therefore preferably completed as quickly as possible.

SUMMARY

One object of the invention is to provide a printer, and a firmware rewriting method enabling rewriting firmware in a short time in a printer having multiple processor cores.

A firmware rewriting method of a printer having multiple processor cores according to the invention includes: rewriting first firmware of a first core by a boot program of the first core; and rewriting second firmware of a second core, which is one of the multiple cores other than the first core, by the boot program.

Preferably, the firmware rewriting method also includes resetting the printer after rewriting the first firmware and rewriting the second firmware.

A printer having multiple processor cores according to another aspect of the invention has: a first core storing a boot program and first firmware; a second core that is one of the multiple cores other than the first core, and stores second firmware; the first core rewriting the first firmware of the first core and rewriting the second firmware of the second core by the boot program.

Preferably, the printer also has a reset unit (reset circuit) that resets the printer after the first firmware and the second firmware are rewritten by the boot program of the first core.

This aspect of the invention rewrites the first firmware of the first core and rewrites the second firmware of the second core by the boot program of the first core, and can therefore shorten the time required for rewriting firmware compared with a conventional process that rewrites firmware for each core separately. In other words, the invention can eliminate the steps of reporting when rewriting ends to the other core (S107 and S112 in FIG. 7), and the step of saving the boot data (boot program) of the second core (step S109 in FIG. 7). Because the second core does not need to control rewriting, development of firmware required for adding functionality by adding a second core is easier.

Note that if there are three or more cores, processes for rewriting the third firmware, fourth firmware, and such may be added to rewriting the first firmware and rewriting the second firmware. In this event, the reset unit resets after rewriting the firmware for all cores is completed. The required time can be shortened because there is no need to reset after rewriting the firmware for each core.

In the firmware rewriting method of a printer according to another aspect of the invention, the first core changes control from the first firmware to the boot program based on a specific command from an external device.

In a printer according to another aspect of the invention, the first core changes control from the first firmware to the boot program based on a specific command from an external device.

Thus comprised, the printer can be controlled to executes the rewrite process in response to a specific command received firmware rewriting method an external device.

In the firmware rewriting method of a printer according to another aspect of the invention, the first core can communicate by a first communication method, and the second core can communicate by a second communication method different from the first communication method.

Thus comprised, the time required to rewrite firmware when a functionality to communicate by a second communication method is added to a printer that is compatible with a first communication method.

In the firmware rewriting method of a printer according to another aspect of the invention, the first core receives from an external device the first rewrite firmware for rewriting the first firmware, and the second rewrite firmware for rewriting the second firmware.

Thus comprised, because the first rewrite firmware and the second rewrite firmware are received in a batch, the number of communications with the external device that sends the rewrite firmware can be reduced.

In the firmware rewriting method of a printer according to another aspect of the invention, the first core receives the first rewrite firmware and the second rewrite firmware from an external device by the first communication method, or receives the first rewrite firmware and second rewrite firmware from the external device through the second core by the second communication method.

Thus comprised, the firmware to be rewritten can be received by two different communication methods.

Note that the specific command that triggers changing the operating mode can preferably be received by both communication methods.

The firmware rewriting method of a printer according to another aspect of the invention preferably also includes: storing (saving) the received first rewrite firmware and the second rewrite firmware by the boot program of the first core to memory outside the first core and the second core; rewriting the first firmware of the first core using the first rewrite firmware read from memory; and rewriting the second firmware of the second core using the second rewrite firmware read from memory.

Thus comprised, because the rewrite firmware that is received is stored to memory other than first core and second core memory, the internal storage capacity of the first core is not relevant. In addition, because the rewrite process executes after the rewrite firmware is saved to memory, the rewrite process can continue even if communication with the external device is interrupted during the rewrite process Other objects and attainments together with a fuller understanding of the invention will become apparent and appreciated by referring to the following description and claims taken in conjunction with the accompanying drawings.

DESCRIPTION OF EMBODIMENTS

Figure 1:
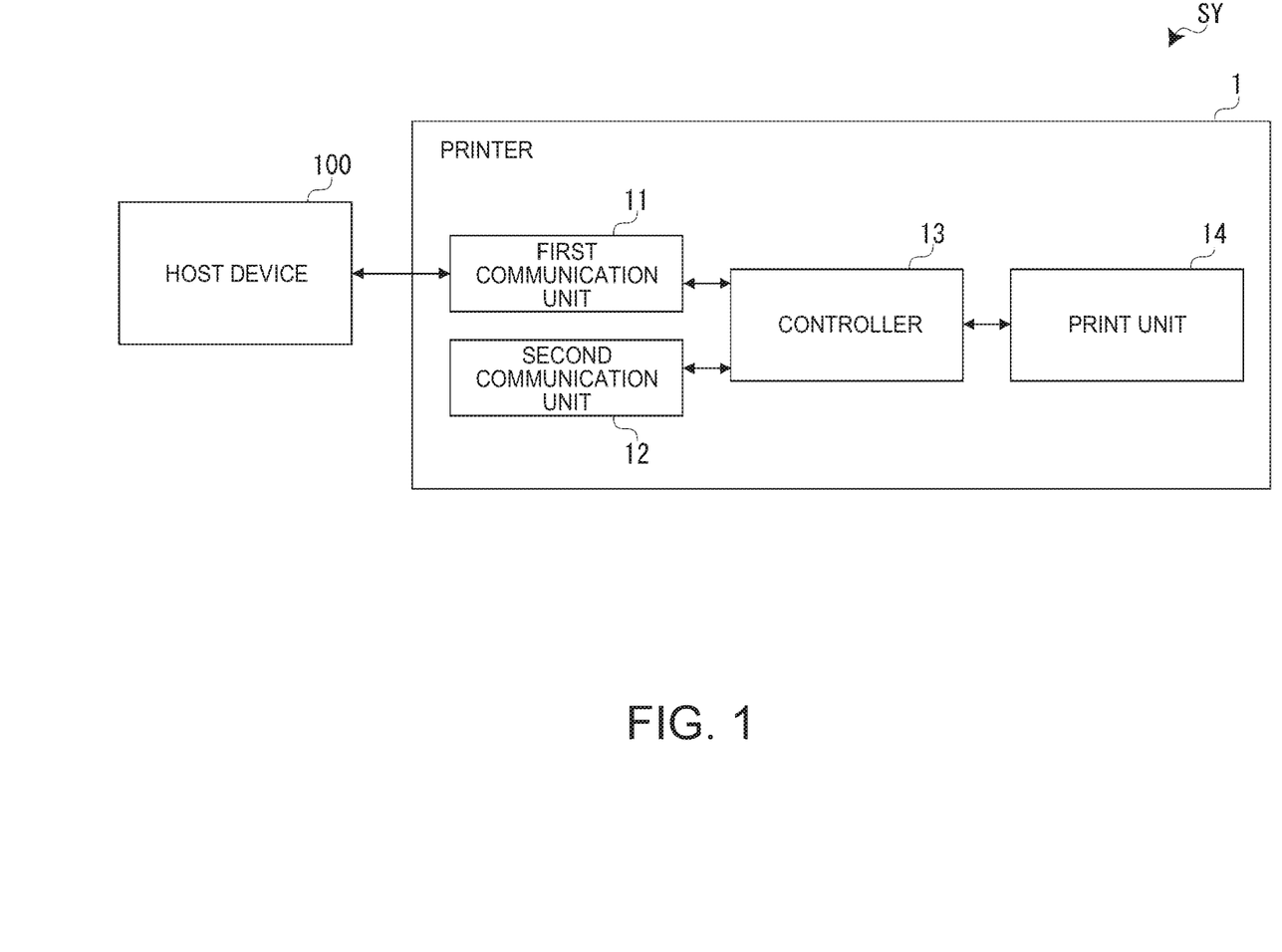
FIG. 1 is a block diagram illustrating the configuration of a printing system according to the invention.

Preferred embodiments of a firmware rewriting method and a printer according to the present invention are described below with reference to the accompanying figures. FIG. 1 is a block diagram showing the configuration of a printing system SY according to this embodiment of the invention. The printing system SY includes a host device 100 (external device) and a printer 1. The host device 100 sends updated firmware for updating (rewriting) printer firmware to the printer 1. The host device 100 may also be a device that sends print data to the printer 1. The host device 100 and printer 1 connect by wired or wireless communication.

The printer 1 includes a first communication unit (first communicator) 11, second communication unit (second communicator) 12, controller 13, and print unit (printing mechanism) 14. The first communication unit 11 and second communication unit 12 are interfaces respectively compatible with a first communication protocol (first communication method) and a second communication protocol (second communication method). The communication protocols (communication methods) may be USB, Ethernet, or Bluetooth, for example. In this embodiment, the first communication protocol is USB, and the second communication protocol is Ethernet. The host device 100 connects to the first communication unit 11.

The controller 13 controls overall printer 1 operation. The controller 13 is described in detail below. The print unit 14 includes a printhead for printing on roll paper or other print medium, a conveyance mechanism for conveying the print medium, and a cutting mechanism for cutting the print medium.

Figure 2:
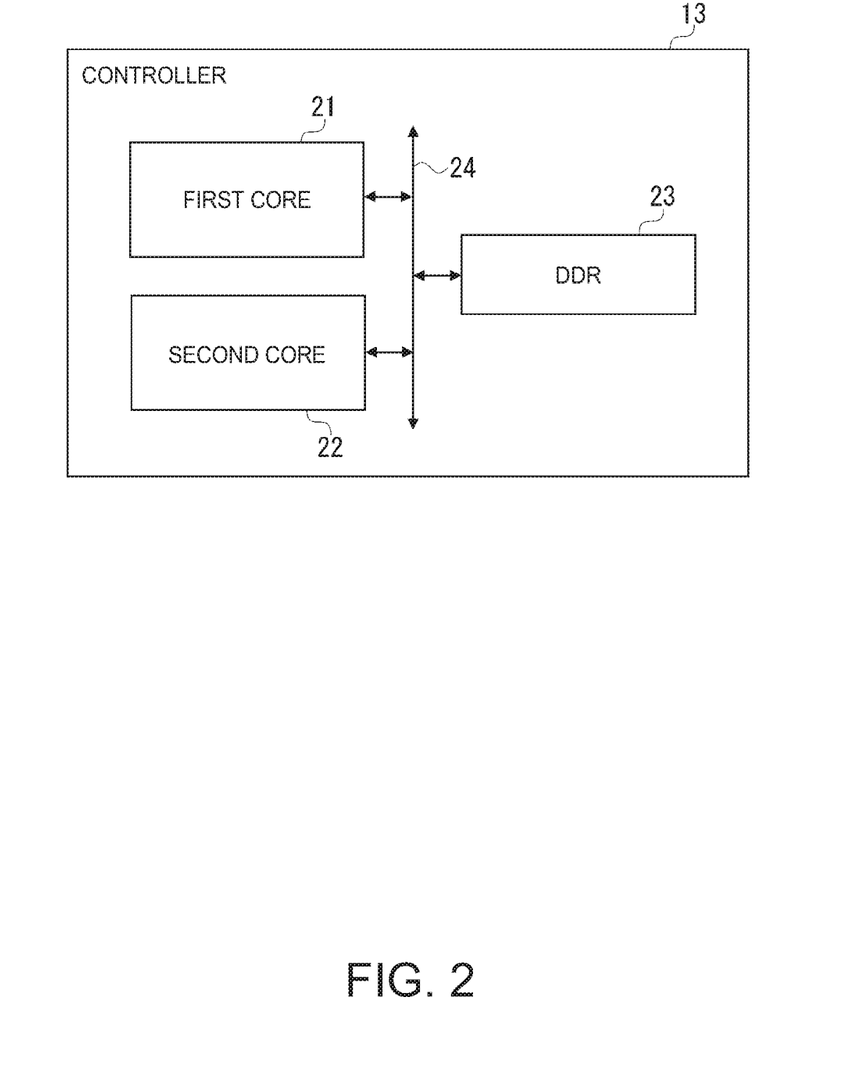
FIG. 2 is a block diagram illustrating the configuration of the controller.

FIG. 2 is a block diagram illustrating the configuration of the controller 13. The controller 13 includes a first core 21, second core 22, and DDR (double-data-rate SDRAM) 23. These devices connected through a bus 24.

The first core 21 is a processor core that executes main processes (normal printing processes) and writing processes of the printer 1, and communicates with the host device 100 using the first communication protocol (USB). The second core 22 is a processor core that handles network processes, and communicates with an external device not shown using the second communication protocol (Ethernet). DDR 23 is a rewritable, volatile storage medium, and functions as expansion memory (memory). This embodiment of the invention anticipates adding a new network communication function by adding the second core 22 and DDR 23 to a printer 1 having the first core 21. After the second core 22 and DDR 23 are added, the printer 1 is characterized by the first core 21 controlling rewriting both the firmware of the first core 21 and the second core 22. This is described in detail below.

Figure 3A:
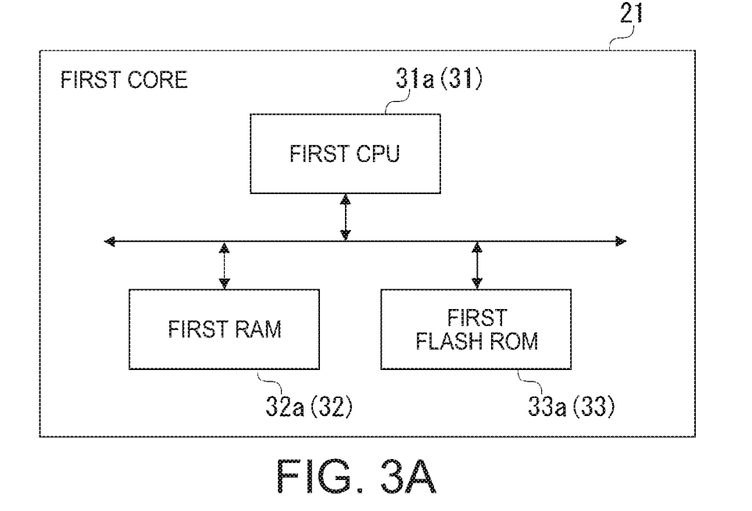
FIG. 3A is a block diagram illustrating the hardware configuration of the first core.
Figure 3B:
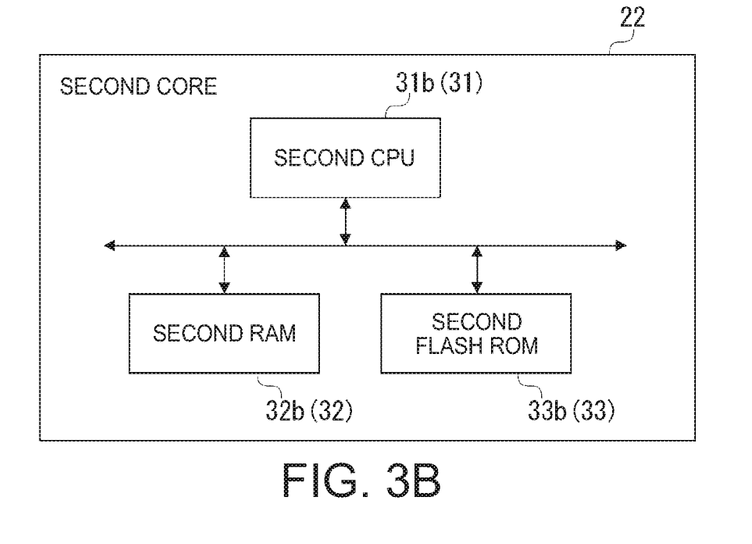
FIG. 3B is a block diagram illustrating the hardware configuration of the second core.

The configurations of the cores 21, 22 are described next. FIG. 3A is a block diagram illustrating the hardware configuration of the first core 21, and FIG. 3B is a block diagram illustrating the hardware configuration of the second core 22. As shown in FIG. 3A and FIG. 3B, the cores 21, 22 each have a CPU (Central Processing Unit) 31, RAM (Random Access Memory) 32, and flash ROM (Read Only Memory) 33.

RAM 32 is a rewritable, volatile storage medium for temporarily storing data. Data stored in flash ROM 33 is saved (copied) to RAM 32 and used therefrom by the CPU 31.

The flash ROM 33 is a rewritable, nonvolatile storage medium. The flash ROM 33 is divided into multiple sectors, and data can be written by sector unit. The sector configuration is described below.

To differentiate hardware components of the cores 21, 22 below, the first core 21 is described having a first CPU 31*a*, first RAM 32*a*, and first flash ROM 33*a*, and the second core 22 as having a second CPU 31*b*, second RAM 32*b*, and second flash ROM 33*b*.

Figure 4A:
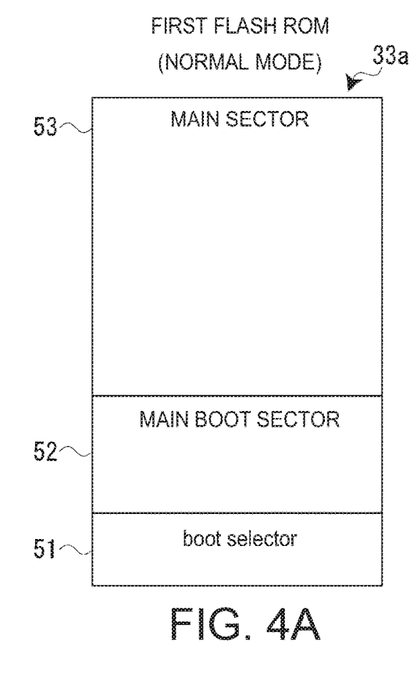
FIG. 4A illustrates the sector configuration of first flash ROM in the normal mode.
Figure 4B:
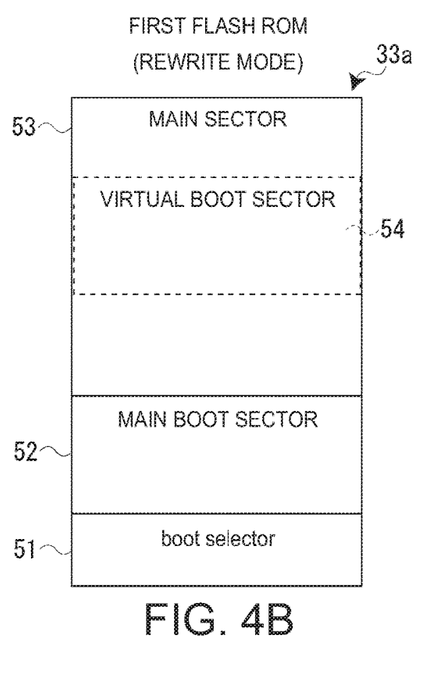
FIG. 4B illustrates the sector configuration of first flash ROM in the rewrite mode.

The sector configuration of the first flash ROM 33*a* is described next with reference to FIG. 4. FIG. 4A shows the sector configuration when in the normal operating mode, and FIG. 4B shows the sector configuration in the rewrite mode.

As shown in FIG. 4A, in the normal operating mode the first flash ROM 33*a* is divided into a boot selector 51, main boot sector 52, and main sector 53. During the rewrite mode, the first flash ROM 33*a* has, in addition to the boot selector 51, main boot sector 52, and main sector 53, a virtual boot sector 54 that functions as a temporary boot sector by being overwritten to part of the main sector 53.

The boot selector 51 is described first. The boot selector 51 stores boot selector data that is executed the first time the printer 1 boots up. The boot selector data includes default boot data and a boot selector program. The default boot data executes a default startup process immediately after the printer 1 power turns on. After the default boot data executes, the boot selector program selects the boot data (either boot data in the main boot sector 52 described below, or boot data in the virtual boot sector 54) to copy to the first RAM 32*a*.

Boot selector data is data configured so that it is basically not rewritten, and executes the minimum functions (including minimal hardware check and initialization) required to boot the printer 1. The boot selector data also copies the boot sector data selected by the boot selector data to first RAM 32*a*.

The main boot sector 52 and virtual boot sector 54 are described next. The main boot sector 52 and virtual boot sector 54 store boot data (boot program) for executing start processes and controlling rewriting firmware. The boot data includes a boot program, main upgrade program, and rewrite control program. The boot program executes the boot process for completely booting the printer 1. The main upgrade program is executed after the boot program executes, and handles going to the process of the firmware in the main sector 53 described below. The rewrite control program controls rewriting first flash ROM 33*a* and second flash ROM 33*b*.

The main boot sector 52 is always reserved in first flash ROM 33*a*, and the virtual boot sector 54 is a sector that is created only temporarily in first flash ROM 33*a* when in the rewrite mode. More specifically, when rewriting firmware and the boot data in the rewrite mode, the virtual boot sector 54 is a sector that is temporarily defined by overwriting part of the main sector 53 with new boot data received from a host device 100 that can communicate with the printer 1. By thus using a double-boot configuration, this embodiment of the invention reduces risks associated with boot data write failures, and because there is no need to provide multiple permanent boot sectors in first flash ROM 33*a*, space in first flash ROM 33*a* can be used efficiently in the normal operating mode. Note that in the rewrite process described below, only the firmware is rewritten; the boot data is not rewritten.

A checksum for verifying if the boot data is correct is stored in the main boot sector 52 and virtual boot sector 54. The correctness of the checksum is determined by the first CPU 31*a*. The boot selector program of the boot selector 51 selects the normal boot data from the main boot sector 52 or virtual boot sector 54, and copies the normal boot data to first RAM 32*a*. When the normal boot data is copied to first RAM 32*a*, the remaining firmware rewriting process is executed by the rewrite control program in the normal boot data copied to first RAM 32*a*. Below, the area where the normal boot data is copied in first RAM 32*a* is referred to below as the boot data startup area.

The main sector 53 is described next. Stored in the main sector 53 are the main program controlling the normal operating mode of the printer 1; a calling program that calls the rewrite control program in the boot data startup area in response to a rewrite command from the host device 100; and firmware including font data and configuration settings. After the boot program stored in the boot data startup area is executed, the firmware is read and run and controls operation of the printer 1 in the normal operating mode.

The main sector 53 is rewritten by the rewrite control program in the boot data startup area. Like the main boot sector 52 and virtual boot sector 54, the main sector 53 also stores a checksum for confirming the correctness of the firmware.

The sector configuration of the first flash ROM 33*a* is described above. The sector configuration of the second flash ROM 33*b* is the same, and further description thereof is omitted. However, the second flash ROM 33*b* may be single boot instead of double boot. The sector configuration of the first flash ROM 33*a* and second flash ROM 33*b* may also be adapted as needed to provide a boot sector for the operating system as another boot sector, a main sector for the operating system as another main sector, and a registry sector for storing configuration settings separately from the main sector.

Figure 5:
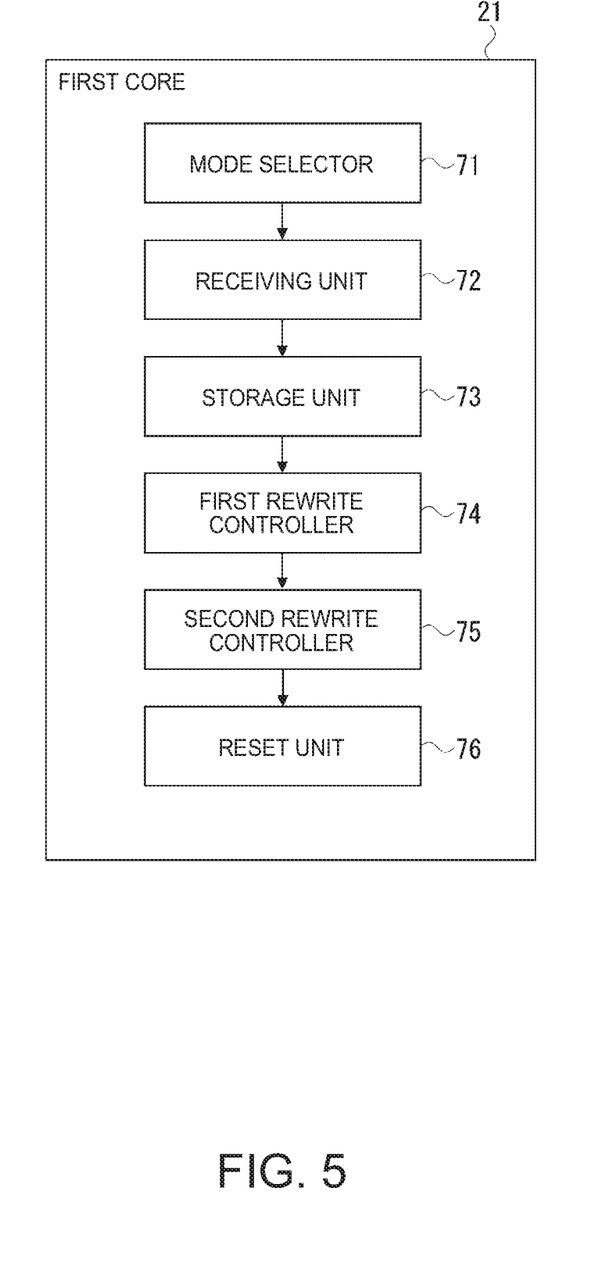
FIG. 5 is a block diagram illustrating the function of the first core.

The functional configuration of the first core 21 is described next with reference to FIG. 5. The main functional configurations of the first core 21 are a mode selector 71, receiving unit (receiver) 72, storage unit (storage) 73, first rewrite controller 74, second rewrite controller 75, and reset unit (reset circuit) 76. These function units are embodied by the first CPU 31*a* executing processes based on data read from first flash ROM 33*a*.

Based on the main program read from the main sector 53 of the first core 21, and triggered by receiving a specific command from the host device 100, the mode selector 71 changes control to the boot data (boot program) read from the main boot sector 52 or virtual boot sector 54 of the first core 21. In other words, the mode changes from the normal operating mode to the rewrite mode. In this embodiment of the invention, the specific command is a real-time command that can execute processes with priority over other commands stored in the receive buffer (not shown in the figure) of the printer 1.

The receiving unit 72 receives from the host device 100 in a single batch through the first communication unit 11 both first rewrite firmware for rewriting the first firmware of the first core 21, and second rewrite firmware for rewriting the second firmware of the second core 22.

Based on the boot data stored in the first core 21, the storage unit 73 stores the first rewrite firmware received by the receiving unit 72 in DDR 23 (expansion memory).

Based on the boot data in the first core 21, the first rewrite controller 74 controls rewriting (controls rewriting first flash ROM 33*a*) the first firmware of the first core 21 using the first rewrite firmware read from the DDR 23.

Based on the boot data in the first core 21, the second rewrite controller 75 controls rewriting (controls rewriting second flash ROM 33*b*) the second firmware of the second core 22 using the second rewrite firmware read from the DDR 23.

Note that the second CPU 31*b* of the second core 22 executes the rewrite process controlled by the second rewrite controller 75 based on the boot data read from second flash ROM 33*b*.

After finishing rewriting the first firmware of the first core 21 and the second firmware of the second core 22, the reset unit 76 controls the printer 1 to reset (instructs the initialization of the first core 21) based on the boot data of the first core 21. Note that the first CPU 31*a* executes the reset process based on the firmware read from the first flash ROM 33*a* when triggered by the reset command.

Figure 6:
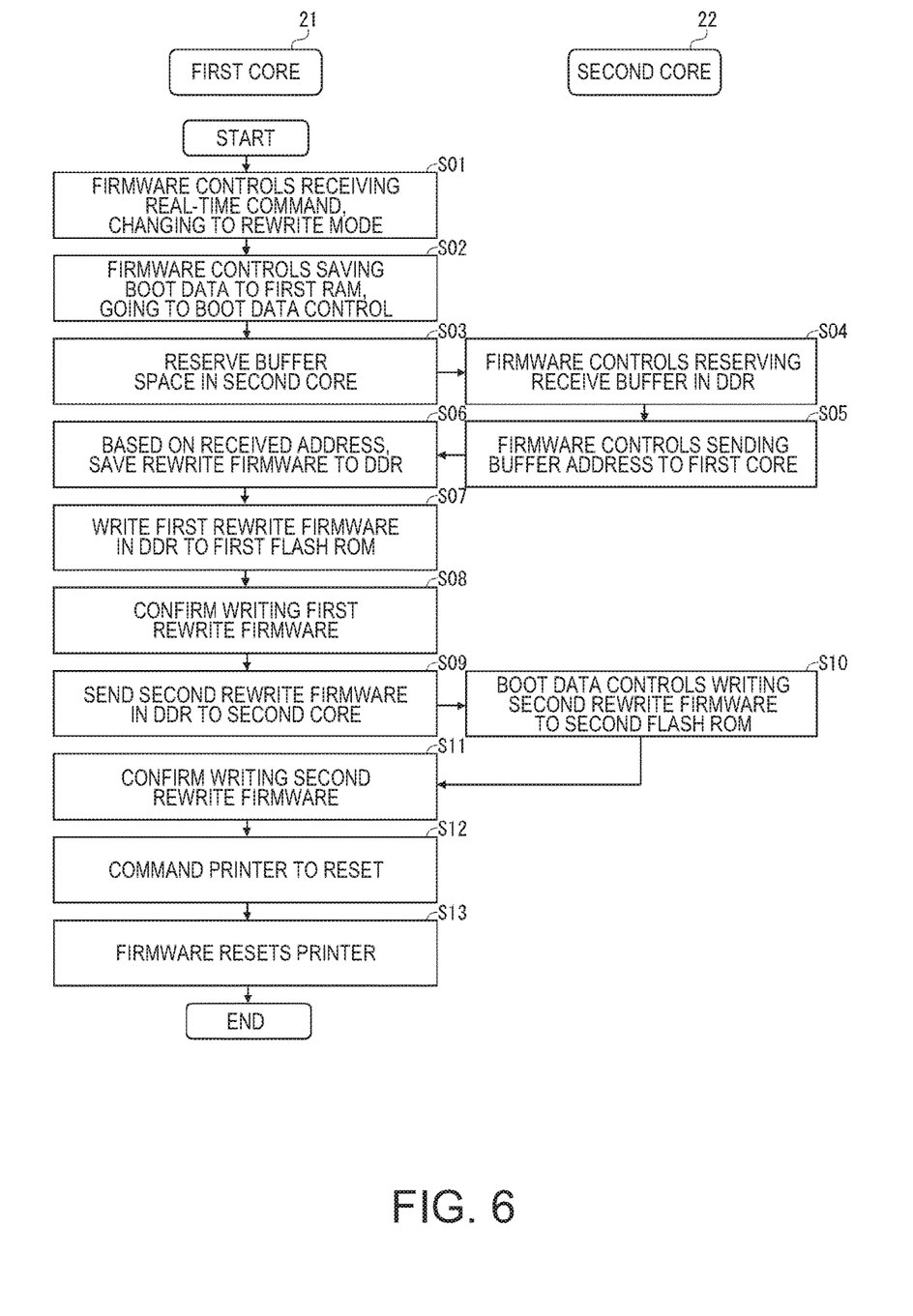
FIG. 6 is a flow chart illustrating the flow of the firmware rewriting process.

The process of rewriting firmware is described next with reference to the flow chart in FIG. 6. First, when a real-time command is received from the host device 100 in the normal operating mode according to the first firmware (main program), the first core 21 changes to the rewrite mode (S01). Next, the first core 21 saves the boot data called from the main boot sector 52 or virtual boot sector 54 by the firmware (calling program) to first RAM 32a, and then switches control to the boot data (rewrite control program) copied to the boot data startup area (S02). Note that S01 and S02 are processes of the mode selector 71. Note also that the boot data copied to the boot data startup area is referred to below as the "startup boot portion."

Next, the first core 21 sends a receive buffer request to reserve a storage area in the DDR 23 to the second core 22 (firmware) by the startup boot portion (S03). The second core 22 reserves a receive buffer area in the DDR 23 by its firmware (S04), and sends the address of the reserved receive buffer area to the first core 21 (startup boot portion) (S05). Based on the address reported from the second core 22, the startup boot portion of the first core 21 firmware stores the rewrite firmware (first rewrite firmware and second rewrite firmware) received by the receiving unit 72 to DDR 23 (S06). Thereafter, steps S03 and S06 are processed of the storage unit 73. Note that the receiving unit 72 receives the rewrite firmware between S01 and S03.

The first core 21 then writes the first rewrite firmware stored in DDR 23 to the main sector 53 in first flash ROM 33a by the startup boot portion of the firmware (S07), and then verifies writing successfully based on the checksum (S08). Thereafter, S07 and S08 are processes of the first rewrite controller 74.

The first core 21 then sends the second rewrite firmware stored in DDR 23 to the second core 22 (second RAM 32b) by the startup boot portion (S09). The second core 22 then writes the second rewrite firmware to the main sector of the second flash ROM 33b based on the boot data (rewrite control program) saved to second RAM 32b (S10). The first core 21 then checks if the second rewrite firmware was written correctly by the startup boot portion based on the checksum (S11). Thereafter, S09 and S11 are processes of the second rewrite controller 75.

Next, the first core 21 instructs the printer 1 to reset by the startup boot portion (main upgrade program) (S12). Based on this instruction, the first CPU 31a resets the printer 1 by the first firmware of the first core 21 (S13). Thereafter, S12 and S13 are processes of the reset unit 76. Note that both the reset process and instructing the printer 1 to reset may be executed by the startup boot portion.

As described above, because the first CPU 31a of the first core 21 rewrites the first firmware of the first core 21, rewrites the second firmware of the second core 22, and controls resetting by the boot data, the printer 1 according to this embodiment can shorten the time required for rewriting firmware compared with a process that rewrites firmware for each core separately. In other words, the invention can eliminate the shaded steps (S106, S107, S109, S112) required by the related art shown in FIG. 7.

Because the second core 22 does not need to control rewriting, firmware development is simplified when functions are added by adding a second core 22. Furthermore, because the invention is configured to switch from the normal operating mode to the rewrite mode when a real-time command is received from the host device 100, the operating mode can be reliably changed even if the printer 1 is busy.

Because the first core 21 receives first rewrite firmware and second rewrite firmware in a batch, the host device 100 only needs to transmit the rewrite firmware to the printer 1 once. Furthermore, because the first core 21 saves the received rewrite firmware to DDR 23, the capacity of the first RAM 32a does not matter. In addition, because the rewrite process executes after the rewrite firmware is stored to DDR 23, the rewrite process can continue executing even if communication with the host device 100 is interrupted during the rewrite process.

Some other embodiments of the invention are described below.

EXAMPLE 1

The receiving unit 72 receives the rewrite firmware by a first communication protocol (USB) in the embodiment described above, but could receive the rewrite firmware by the second communication protocol (Ethernet). In this event, the first core 21 receives a real-time command through the second core 22, and goes to the rewrite mode. The first core 21 also saves the rewrite firmware received through the second core 22 by the startup booth portion to DDR 23.

EXAMPLE 2

The embodiment described above rewrites firmware without rewriting the boot data in the rewrite process, but the boot data may also be rewritten. In this event, the new boot data to rewrite is rewritten to the main boot sector 52 and virtual boot sector 54 by the startup boot portion (old boot data) saved to first RAM 32a, and the rewrite firmware is then written to the main sector 53.

EXAMPLE 3

A network function is added by adding a second core 22 in the embodiment described above, but the invention can also be used to add other communication functions, such as Bluetooth and infrared. The invention is also not limited to network functions, and may be used to add background processing functions (such as encryption processing, and peripheral device control functions in conjunction with adding peripheral devices). Processes other than the normal processes that are executed by the first core 21 can also be executed by the second core 22.

EXAMPLE 4

The received rewrite firmware is stored by the first core 21 in the DDR 23 in the embodiment described above, but if DDR 23 is not available, the firmware may be stored in first RAM 32a in the first core 21.

EXAMPLE 5

The foregoing embodiment describes a double boot configuration using a permanent main boot sector 52 in the first flash ROM 33a and a virtual boot sector 54 temporarily overwritten to the main sector 53, but configurations having two permanent boot sectors in the first flash ROM 33a are also conceivable.

Other embodiments

Functional elements of the printer 1 described above can also be provided as programs. Such programs can also be stored and distributed on various recording media (such as CD-ROM, flash memory). More specifically, a program causing a computer to function as parts of the printer 1, and recording media recording the program, are also included in the scope of the accompanying claims.

A printer 1 having two cores is also used as an example above, but the invention can obviously be applied to a printer 1 having three or more cores. In this event, the first core 21 controls rewriting for all other cores. The invention is also not limited to a printer 1, and can be applied to any electronic device having multiple processor cores.

A CPU (core) can achieve the described units by executing a program in a memory or a storage. A circuit (including an ASIC or a FPGA) can achieve the described units. The combination of any of these can achieve the described units.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A firmware rewriting method of a printer, comprising:
receiving, by a first core that includes a first processor and a first memory, from an external device, first rewrite firmware for rewriting first firmware and second rewrite firmware for rewriting second firmware;
storing the received first rewrite firmware and the second rewrite firmware using a boot program of the first core to a memory outside the first core and the second core;
rewriting the first firmware of the first core using the boot program of the first core and the first rewrite firmware read from the memory outside the first core and the second core;
rewriting the second firmware of a second core that includes a second processor and a second memory using the boot program and the second rewrite firmware read from the memory outside the first core and the second core; and
resetting the printer after rewriting the first firmware and rewriting the second firmware.

2. The firmware rewriting method of a printer described in claim 1, further comprising:
the first core changing control from the first firmware to the boot program based on a specific command from the external device.

3. The firmware rewriting method of a printer described in claim 1, wherein:
the first core can communicate by a first communication method, and the second core can communicate by a second communication method different from the first communication method.

4. The firmware rewriting method of a printer described in claim 3, wherein:
the first core receives the first rewrite firmware and the second rewrite firmware from the external device by the first communication method, or receives the first rewrite firmware and second rewrite firmware from the external device through the second core by the second communication method.

5. A printer, comprising:
a first core that includes a first processor and a first memory, the first core storing a boot program and first firmware;
a second core that includes a second processor and a second memory, the second core storing second firmware;
memory outside of the first core and the second core configured to store received first rewrite firmware and second rewrite firmware; and
a reset unit configured to reset the printer after the first firmware and the second firmware are rewritten using the boot program of the first core;
wherein the first core is configured to rewrite the first firmware of the first core and to rewrite the second firmware of the second core using the boot program,
the first core is configured to receive from an external device the first rewrite firmware for rewriting the first firmware, and the second rewrite firmware for rewriting the second firmware, and
the first core configured to rewrite the first firmware of the first core using the first rewrite firmware read from the memory outside of the first core and the second core, and to rewrite the second firmware of the second core using the second rewrite firmware read from the memory outside of the first core and the second core.

6. The printer described in claim 5, wherein:
the first core is configured to change control from the first firmware to the boot program based on a specific command from the external device.

7. The printer described in claim 5, further comprising:
the first core is configured to communicate by a first communication method, and the second core is configured to communicate by a second communication method different from the first communication method.

8. The printer described in claim 7, wherein:
the first core is configured to receive the first rewrite firmware and the second rewrite firmware from a first external device by the first communication method, and is configured to receive the first rewrite firmware and second rewrite firmware from a second external device through the second core by the second communication method.

* * * * *